United States Patent
Bolik et al.

(10) Patent No.: US 9,710,178 B2
(45) Date of Patent: Jul. 18, 2017

(54) OPTIMIZING VOLUME PLACEMENT BASED UPON DESIRED RESPONSE TIME AND PRIORITY

(71) Applicant: INTERNATIONAL BUSINESS MACHINES CORPORATION, Armonk, NY (US)

(72) Inventors: Christian Bolik, Oldenburg (DE); Stephen A. Byrd, Sunnyvale, CA (US); Benjamin J. Randall, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 14/683,677

(22) Filed: Apr. 10, 2015

(65) Prior Publication Data

US 2016/0299711 A1 Oct. 13, 2016

(51) Int. Cl.
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC ...... G06F 3/0689; G06F 3/0665; G06F 3/061; G06F 3/0619; G06F 3/0647; G06F 3/0659
See application file for complete search history.

(56) References Cited

U.S. PATENT DOCUMENTS

| | | | |
|---|---|---|---|
| 6,314,503 B1 | 11/2001 | D'Errico et al. | |
| 8,185,779 B2 | 5/2012 | Devarakonda et al. | |
| 8,433,848 B1 | 4/2013 | Naamad et al. | |
| 8,443,163 B1 | 5/2013 | Bailey et al. | |
| 2009/0276771 A1* | 11/2009 | Nickolov | G06F 9/4856 717/177 |
| 2012/0331249 A1* | 12/2012 | Benjamin | G06F 3/0607 711/162 |
| 2013/0080728 A1 | 3/2013 | Cashman et al. | |
| 2013/0179657 A1* | 7/2013 | Isomura | G06F 3/0605 711/165 |
| 2013/0198449 A1 | 8/2013 | Belluomini et al. | |
| 2015/0199148 A1* | 7/2015 | Hrischuk | G06F 3/0653 711/114 |
| 2016/0269313 A1* | 9/2016 | Brooker | G06F 9/5072 |

OTHER PUBLICATIONS

Narayanan, D., et al. "Migrating Server Storage to SSDs: Analysis of Tradeoffs". EuroSys '09. Apr. 1-3, 2009. Nuremberg, Germany. Copyright 2009.

(Continued)

*Primary Examiner* — Hashem Farrokh
(74) *Attorney, Agent, or Firm* — William W. Hartwell

(57) ABSTRACT

A method, computer program product, and system for determining an optimal volume placement on a storage system. The method includes acquiring at least a desired response time range for each storage volume associated with an application. The degree of optimization of volume placement is evaluated utilizing numeric scores assigned by a fitness function, and a recommendation is provided for storage volumes that should be moved to different storage pools, such that desired response times are met.

20 Claims, 4 Drawing Sheets

(56) References Cited

OTHER PUBLICATIONS

Verma, A., et al. "An Architecture for Lifecycle Management in Very Large File Systems". Proceeding of the 22nd IEEE / 13th NASA Goddard Conference on Mass Storage Systems and Technologies (MSST'05).

Verma, A., et al. "SRCMap: Energy Proportional Storage using Dynamic Consolidation". FAST'10 Proceedings of the 8th USENIX conference on File and storage technologies. USENIX Association Berkeley, CA, USA © 2010.

Zhang, R., et al. "IO Tetris: Deep Storage Consolidation for the Cloud via Fine-grained Workload Analysis". 2011 IEEE 4th International Conference on Cloud Computing. Copyright 2011. pp. 700-707.

\* cited by examiner

OPTIMIZING VOLUME PLACEMENT BASED UPON DESIRED RESPONSE TIME AND PRIORITY

FIELD OF THE INVENTION

The present invention relates generally to storage systems and in particular to determining optimum storage volume placement.

BACKGROUND OF THE INVENTION

Optimal placement of storage volumes is desirable in an effort to maintain desired application response times. This may be a time-consuming process, and storage administrators are often too busy dealing with other issues to perform proactive optimization. One aspect of optimization is utilization of storage volumes selected from appropriate tiers of storage.

Tiers of storage, in this context, is common industry terminology that represents performance/cost of various forms of storage. Although precise definitions for the various storage tiers are elusive, since conventions may vary from one provider to another, Tier 1 storage is generally fast, accurate storage supported by high-speed disk systems that are often associated with premium pricing. Tier 2 storage systems provide adequate performance in applications where high-speed data interchange is not generally required, but large amounts of data may be involved. Tier 2 storage systems are generally available at a lower cost than Tier 1 storage systems. Tier 3 storage systems are often directed toward storage of data that are accessed infrequently, but nonetheless require reasonable availability. Tier 3 storage is generally available at a lower cost (reflecting lower performance) than the higher level storage tiers. The numbering system for storage tiers is often not intuitive, since a commonly-used convention may refer to high-performance storage as Tier 1 and lower performance storage as Tier 3, while clinging to the notion that Tier 1 storage is a "higher tier" than Tier 3, even though it is denominated by a lower number.

By moving "hot" volumes (volumes frequently accessed with high-speed data interchange) to higher tiers of storage (such as Tier 1), desired performance can be obtained, while moving cold volumes (volumes that are less frequently accessed at lower data transfer rates) to lower tiers of storage (such as Tier 3) allows for the use of lower-performance, less costly storage solutions, leading to greater system economy. Optimal volume placement may amount to a tricky balancing act, wherein a storage administrator seeks to meet application response time requirements while at the same time using the lowest tier storage possible.

SUMMARY

Embodiments in accordance with the present invention disclose a method, computer program product, and system for determining an optimal volume placement on a storage system. The method includes acquiring at least a desired response time range for each storage volume associated with an application. The degree of optimization of volume placement is evaluated utilizing numeric scores assigned by a fitness function, and a recommendation is provided for storage volumes that should be moved to different storage pools, such that desired response times are met.

DETAILED DESCRIPTION

Figure 1:
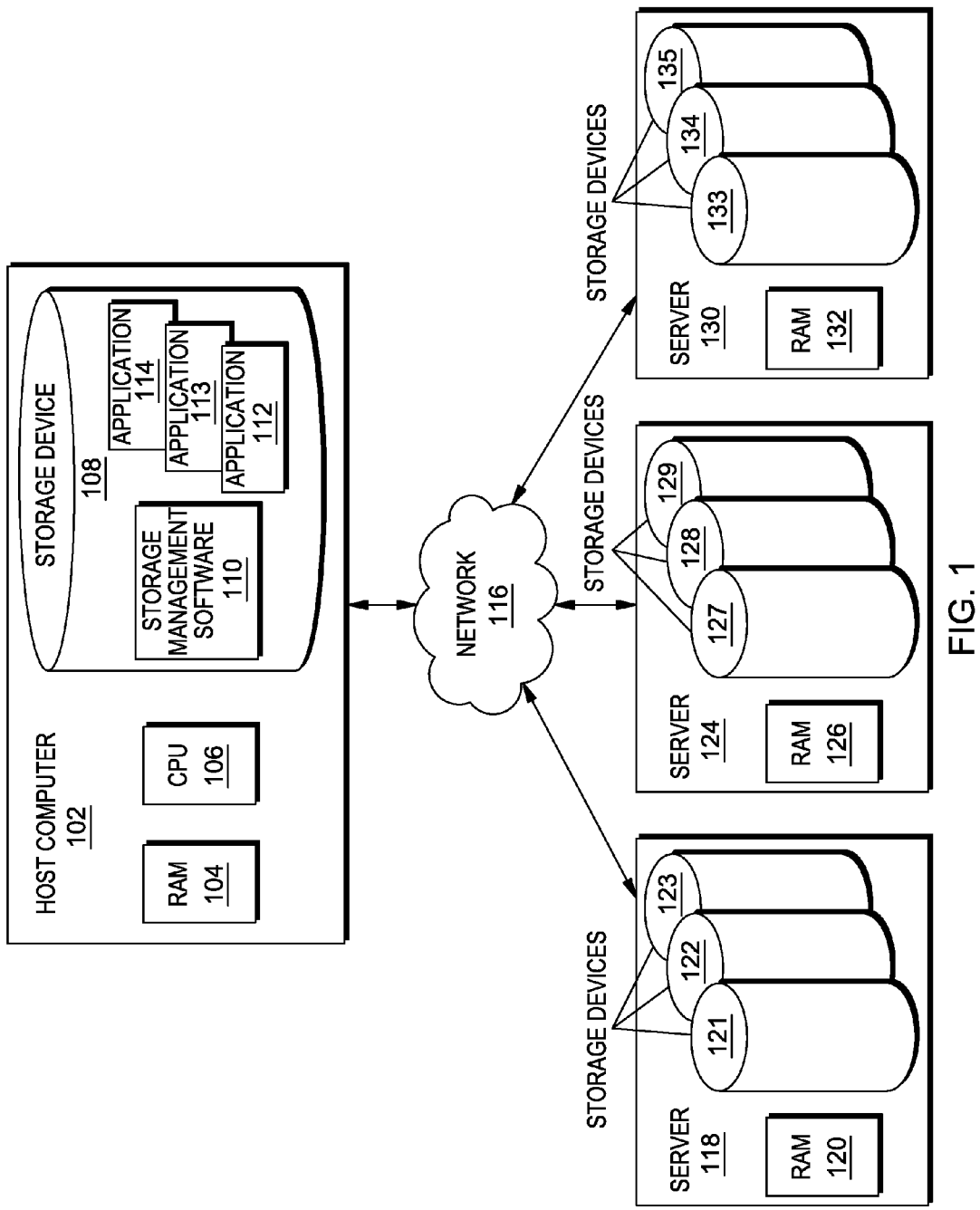
FIG. 1 is a functional block diagram illustrating a distributed data processing environment, in an embodiment in accordance with the present invention.

A desired aspect of storage optimization is to provide applications with acceptable response times while at the same time using the lowest tier of storage possible. A user, or automated system, determines where existing volumes should be moved in order to achieve these goals. Automated solutions have been attempted to address tiering and performance needs. At least one attempted solution relies on thresholds for when data should be moved to a higher or lower tier. For example, if I/O (Input/Output) Density is greater than a certain value, then a volume might be moved to a higher tier storage pool, hopefully resulting in better response times. If I/O Density is lower than a certain value, then a volume might be moved to a lower tier storage pool. This frees up expensive high-tier storage, and hopefully does not dramatically degrade response time for a volume being moved. Another approach uses an internally calculated threshold to determine the most heavily used portions of volumes over a limited time period, and then distributes the volume portions (extents, or fixed-size portions of a storage volume) across different storage tiers.

A user's intent when optimizing is often simply to ensure that a given application's set of volumes falls into an acceptable response time range. Difficulties abound in determining how to set proper thresholds with existing solutions that rely on IOPS (Input/Output Operations per Second, a performance metric for storage devices) or I/O Density thresholds. Setting these thresholds for up and down tiering does not yield a good understanding of the response times that a particular user's applications may receive. Similarly, automated schemes that require no input are often unable to account for variations in need and priority between volumes.

Embodiments in accordance with the present invention are directed toward a system that is capable of creating an optimal volume placement plan such that desired response times are met, while still being conscious of the tier of storage being used. For a given set of volumes, such as the volumes belonging to an application, the user may set a desired response time window, for example between 10 and 20 milliseconds per operation. Having specified desired response time windows for one or more sets of volumes, the user is able to trigger the system to perform an analysis of the storage arrangement and provide a recommendation for volumes that should be moved to different pools, such that all desired response times are met. While evaluating potential solutions, the system is able to take into account particular tiers of storage in order to minimize utilization of high tier pools.

Embodiments in accordance with the present invention also contemplate a fitness function that may be flexibly used in a number of machine-implemented evolutionary or learning algorithms, such as genetic algorithms or hill-climbing algorithms. Various parameters may be tuned in order to achieve goals such as favoring down-tiering and favoring more precise response time windows. Further, in some embodiments, it may be unnecessary to characterize the term "tier" precisely, in order to allow for differing interpretations and definitions.

The type of function that may typically use a fitness function (or FF) may perhaps best be characterized as an "evolutionary algorithm," the most common class of which is probably "genetic algorithms." Machine learning algorithms do not necessarily use evolutionary algorithms, and can instead use other approaches in combination with an FF—such as hill-climbing or other search-based approaches—and it is appropriate herein that an FF be defined such that it could be used in such situations as well. Consequently, it may be desirable that the primary direct usage of an FF, such as the FF described herein, be in an evolutionary algorithm.

Embodiments in accordance with the present invention offer ease of configuration for a system in order to achieve target response times. Rather than guess which tier thresholds should be used for metrics such as I/O Density or IOPS, the user is able to specify the true end goal—the range of acceptable response times for a group of volumes. In an embodiment, this type of solution simply requires initialization of selected parameters, and then it can simply be allowed to run. If a user were to specify target response times for all of the applications in an environment, the system can create movement recommendations for any volumes in the environment, while assuring that desired response times are being kept for all applications.

In an embodiment, this solution offers significant power and flexibility in distinguishing between high and low priority volumes, as well as clarifying actual needs of a volume to avoid situations in which lower-priority volumes temporarily crowd out higher-priority ones. An embodiment in accordance with the present invention builds off of existing evolutionary algorithms or machine learning algorithms by providing a unique fitness function that takes into account storage-specific knowledge and various other considerations.

Example embodiments in accordance with the present invention will now be described in detail with reference to the drawing figures. FIG. 1 is a functional block diagram illustrating a distributed data processing environment, in an embodiment in accordance with the present invention. The distributed data processing environment includes host computer 102 and server computers 118, 124, and 130, all interconnected over network 116.

Host computer 102 may be a desktop computer, a laptop computer, a tablet computer, a specialized computer server, a smartphone, or any other computer system known in the art. In certain embodiments, host computer 102 may represents a computer system utilizing clustered computers and components that act as a single pool of seamless resources when accessed through network 116, as is common in data centers and with cloud computing applications. In general, host computer 102 is representative of any programmable electronic device or combination of programmable electronic devices capable of executing machine readable program instructions and communicating with other computer devices via a network. In this embodiment, host computer 102 has the ability to communicate with other computer devices, such as server computers 118, 124, and 130 to access or store information, for example.

In an embodiment, host computer 102 includes persistent storage device 108 that may host one or more application programs 112, 113, and 114. Host computer 102 may host a large number of applications, such as application 112, which may require large amounts of storage. In some embodiments, for example, applications may manipulate large databases and require fast data transfer for efficient operation. In an embodiment, storage management software 110, resident on host computer 102, may provide storage optimization through proper storage volume placement among storage devices 121-123, 127-129, and 133-135, that are hosted by server computers 118, 124, and 130, respectively, and are accessible over network 116.

In general, network 116 may be any combination of connections and protocols that can support communications among server computers 118, 124, and 130 and host computer 102. Network 116 may include, for example, a local area network (LAN), a wide area network (WAN), such as the internet, a cellular network, or any combination of the preceding, and can further include wired, wireless, and/or fiber optic connections.

In an embodiment in accordance with the present invention, each server computer 118, 124, and 130 may host storage devices 121-123, 127-129, and 133-135, respectively, that provide different tiers of storage. For example, storage devices 121-123 may be high-tier storage generally associated with a disk system providing highly reliable, accurate storage, and high-speed data interchange. In order to accommodate the need for various tiers of storage that efficiently accommodate the storage requirements of diverse applications (such as applications 112-114, hosted by computer system 102) across a variety of host computer systems, one or more server computers, such as servers 118, 124, and 130, may host multiple storage devices as noted above.

Server computer 124 may host multiple storage devices, such as storage devices 127-129, that provide tier 2 storage, for example, designed to provide adequate performance for lower speed data interchange, but offering high-capacity storage that accommodates large amounts of data. The storage devices 133-135, that are hosted by server 130, may be tier 3 storage, for example, providing storage for data that are accessed infrequently, but should still be readily available. Having multiple storage devices distributed uniformly over the set of storage tiers may be a workable model for optimum storage volume distribution in some systems, but it is likely that empirical data may come into play to aid in deciding the storage volume distribution by storage tier for other systems.

Figure 2:
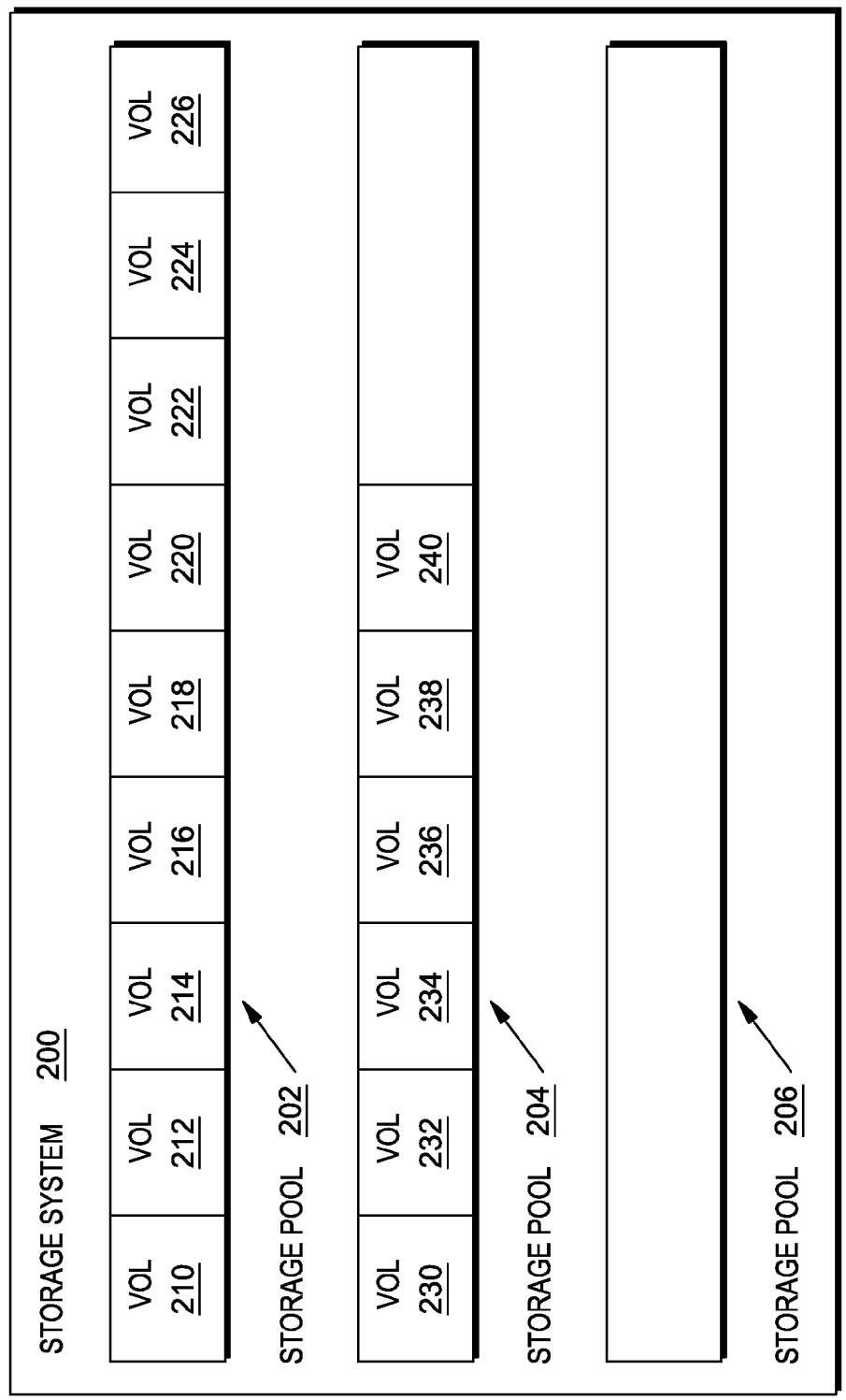
FIG. 2 is a diagram illustrating how particular storage pools may be associated with a storage system in an embodiment in accordance with the present invention.

FIG. 2 is a diagram illustrating how particular storage pools may be associated with a storage system. Storage system 200 is representative of one way in which storage pools may be organized. In an embodiment, storage system 200 may be associated with multiple servers, such as servers 118, 124, and 130, each of which may host multiple storage devices (such as storage devices 121-123) as noted above. In other embodiments, a storage system, such as storage system 200, may, without limitation, be associated with a single server that hosts a large number of storage devices.

Storage devices may be partitioned into storage volumes, so that multiple storage volumes may be hosted by a single storage device. In an alternative embodiment, some storage devices may not be partitioned, so one storage volume may occupy an entire storage device. Storage volumes are generally associated with particular applications, such as applications 112-114, or any one of a number of applications that may be hosted by computer 102.

Storage system 200 comprises a number of storage volumes, and the organization depicted in FIG. 2 serves only as an example of how storage volumes may be associated with a storage device and a storage system. In this example embodiment, storage volumes 210 through 226 are in storage pool 202, and are tier 1 storage volumes of equal size. Storage devices 121-123 hosted by server 118 are each partitioned into three tier 1 storage volumes of equal size, resulting in nine equal size tier 1 storage volumes in storage pool 202. Homogeneity of volume size is not required for proper operation of an optimizing algorithm, but it is possible that a uniform distribution may simplify such an algorithm, or allow the algorithm to execute more quickly. For purposes of this example, although not intended to be limiting, storage devices 121-123 may each be high capacity solid state drives (SSDs), providing the kind of speed and accuracy often associated with tier 1 storage.

Storage pool 204 holds six storage volumes 230 through 240. In this example embodiment, storage volumes 230 through 240 are associated with storage devices 127-129 hosted by server 124. In order to simplify volume distribution, storage volumes 230 through 240 may each be the same size as storage volumes 210 through 226 associated with storage pool 202, although this constraint is not necessary for proper system operation, and is intended to serve as an example only. Storage volumes 230 through 240 in storage pool 204 may be derived by partitioning hard disk drives providing large amounts of storage space, but not the high-speed data interchange normally associated with tier 1 storage volumes. In other words, storage volumes 230 through 240 are tier 2 storage volumes. For purposes of the instant example, storage pool 206 is unpopulated initially, although storage pool 206 may eventually include tier 3 storage volumes partitioned from storage devices 133-135 associated with server 130.

In an illustrative embodiment, application 112 (shown in FIG. 1) is a database application, application 113 is a web application, and application 114 is an e-mail application. Each of these applications has an initial volume placement of three volumes from tier 1 storage and two volumes from tier 2 storage. In other words, in this example embodiment, application 112 is initially assigned storage volumes 210-214 from tier 1 storage pool 202, as well as storage volumes 230 and 232 from tier 2 storage pool 204. Application 113 is initially assigned storage volumes 216-220 from tier 1 storage pool 202 and storage volumes 234 and 236 from tier 2 storage pool 204. Application 114 is initially assigned storage volumes 222-226 from tier 1 storage pool 202 and storage volumes 238 and 240 from tier 2 storage pool 204.

Since optimizing volume placement is a dynamic process, it is useful, in accordance with some embodiments, to maintain a "map" of volume placements in memory that accurately reflects current volume associations. Historical data with regard to volume placements, stored in a log file, for example, may also be useful in the optimized placement scenario. There may, for example, be a constraint on how frequently new volume placements may occur, and a log file may ease the process of tracking relevant time intervals.

For a group of volumes, such as those associated with a particular application, a user may specify the following parameters: (i) a desired response time range, such as 10-20ms; (ii) a degraded response time range, such as 20-30ms; and (iii) a priority. In an embodiment, the desired response time range is a required parameter, while the degraded response time range and priority are optional. The degraded response time range is a range of performance that the user does not prefer, but would be willing to accept.

It is useful for storage management software 110 to be aware of initial volume placements for the applications that it manages. It is also useful for storage management software 110 to have visibility to desired storage volume response time range, permissible degraded response time range, if any, and a priority value, if one is supplied, for each application. The priority value, as noted above, is an optional parameter that can result in a higher priority application being given preferential treatment in terms of storage volume assignment in situations where numeric values determined for volume placements for two competing applications are otherwise equal.

Although user input (by an administrator, for example) may be employed to alert the storage management software 110 of requested storage capacities, initial volume placements, and storage response time parameters for each application, it may simplify system operation to automate sharing of such information. This may be accomplished in a number of different ways. For example, the storage management software 110 may be configured to request the information from each application (such as application 112) at initial application launch, and to store updated information whenever changes occur. Background messaging may also be used to transmit information from an application to the storage management software 110. One such method that may be used in various embodiments in accordance with the present invention is AJAX (Asynchronous JavaScript and XML). Information may also be transmitted to the storage management software 110 through a messaging capability provided through application integration middleware.

It should be noted that the host computer 102 and servers 118, 124, and 130 may be connected via network 116 in what is known as a "client-server" relationship. The client-server model is a popular configuration for networked computing in which the remotely-located computer, or server, is designed to share software and data with a local client that simply needs to establish contact with the server to use its software and data resources. Much effort has been expended to overcome communication impediments that may interfere with proper, and perhaps seamless, communication between resources on a client computer and remote resources located on a server. Many of these difficulties can be resolved through "application integration middleware."

In simple terms, application integration middleware is computer software that resides between the operating system for a particular platform and application software providing desirable functionality. Middleware's primary purposes are facilitating communication and input/output (I/O) operations among applications. Since incompatibilities among disparate applications and data structures are regularly encountered both inside and outside the enterprise setting, even in client-server operations, enabling proper communication and I/O is a feature often found in application integration middleware. This communication feature may enable sophisticated messaging between resources that does not disrupt foreground operations.

The system in accordance with the present invention may be triggered to perform an optimization analysis either through specific invocation by the user, or through automatic detection that a target response time is being violated for one or more volumes. The optimization analysis may include creation of a planned set of volume movements between pools, such that the resulting configuration will have acceptable response times for all volumes. The result of the analysis is a list of volumes destined for movement to a different pool, and identification of the pool to which the volumes will be moved.

The optimization analysis may potentially be performed on a constrained set of pools. In an embodiment, a user may desire the optimization to be performed only with respect to five storage pools on a storage system that includes ten pools. The analysis may also be performed across multiple storage systems and does not need to be constrained to solutions that allow only for non-disruptive volume migration. The analysis is not limited to block storage devices such as subsystems, but can also be performed against any system capable of providing discrete storage.

In an embodiment, the analysis is performed by finding an optimal set of volume placements within the candidate pools, such that the target response times are met. As the solution space for this may be quite large, an evolutionary or machine learning algorithm, such as a genetic algorithm, may be counted upon to reduce overall processing time. The actual algorithm selected is not particularly critical, as long as the algorithm is able to converge on an optimal score using a fitness function. The fitness function is applied to a given solution, which is a specific set of volumes placed in a specific set of pools. In an embodiment, the fitness function may be defined in the following terms: (i) if capacity limits for any pool are breached, the solution is rejected; (ii) for each volume, projected response time is calculated based, at least in part, on the total volume configuration in the pool. In an embodiment, this may be accomplished through feeding historic performance data for a particular volume to an algorithm capable of calculating response times for I/O loads run against specific storage configurations; (iii) if any degraded response times are exceeded, the solution is rejected.

In an embodiment in accordance with the present invention, once a solution is viewed as acceptable to some level, the solution is assigned a numeric score as a way of determining whether it is better than other solutions. In an embodiment, a solution score is generated by summing individual volume scores for all volumes within the scope of the solution. All volumes start with a score of 1 multiplied by the associated priority value, or 1*priority, which assumes perfect placement. In an embodiment, the volume score is then modified as follows: (i) if the volume's projected response time falls within the degraded range, the score is decremented by a tunable parameter. As discussed previously, the degraded range is a range of response times slower than the desired response time range, which is nonetheless acceptable; (ii) if the volume's projected response time is entirely within the desired response time range, then the score remains the same (is not decremented). In an embodiment, the score may be adjusted based on the tier of storage being used by the pool in which the volume is being placed. This allows the user to adjust the volume score to favor higher tiered storage or lower tiered storage; and (iii) if the volume's projected response time is below the desired response time range, then it is cost-rated based on the tier of the pool to which it is being moved. The score may be decremented based on a tunable value per tier. In an embodiment, using tier 1 storage may cause the score to be decremented by 0.5, while using tier 2 storage may cause the score to be decremented by 0.25.

As discussed previously, the term "tier" is intended to be flexible in nature. The term may be used to refer to the type of storage system in which the pool resides, or the type of disk upon which the pool is based. These disk types may include, for example, a solid-state disk (SSD) or a hard disk drive (HDD). The term "tier" could even be used with reference to various cloud service providers.

In an embodiment, the use of a priority may help ensure that solutions are selected where the volumes belonging to particular high priority applications receive their target response times, while lower priority applications may receive degraded response times. A cost rating may be assigned to each storage solution such that solutions that rely on cheaper storage are preferred over other, more costly solutions, where the same response times are being met.

Embodiments in accordance with the present invention contemplate a generic fitness function (FF) that is essentially a formula which uses described inputs and environmental information to provide a numeric score for a particular set of volume placements. Turning once again to the illustrative embodiment discussed with reference to FIG. 2 above, storage system 200 is configured to provide 5 volumes for each of 3 different applications (e-mail, web, and database). The database (or DB) volumes should have a response time between 1ms and 5ms, with no acceptable degraded times. The web volumes should have a response time between 1ms and 4ms, but a degraded range of 3ms to 8ms is acceptable. The email volumes should have a response time between 5ms and 10ms, but a degraded range of 8ms to 20ms is acceptable. No priorities are defined.

All volumes are the same size, and each tier has the same amount of capacity—enough for 9 volumes. Currently, 3 volumes from each application are in tier 1, and 2 volumes from each application are in tier 2. An application is available which predicts volume response time based on I/O load and system configuration. In this case, the response time is retrieved directly from the device as the current configuration is being evaluated.

In this illustrative embodiment, the Fitness Function starts with a score of 15 (one point per volume). The function checks response time of tier 1 volumes, all of which have a response time of 3ms. The three DB volumes have met their criteria, so no change to the score results at this point. All three web volumes have also met their criteria, so there is still no change to the score. The three e-mail volumes are exceeding their criteria, so their scores are multiplied by 0.5 (so 3*0.5=1.5). The score is now 13.5, because the score has decreased from 3 points to 1.5 for these volumes.

The Fitness Function checks the response time of tier 2 volumes, all of which have a response time of 5ms. Thus, the two DB volumes have met their criteria—no change to the score. The two web volumes have not met their criteria, but are within the acceptable degraded range, so their scores are multiplied by a tunable value (the tunable value is 0.75 for this example—so 2*0.75=1.5). The score is now 13 because of the loss of 0.5 point for these volumes. The two e-mail volumes are meeting their criteria, so no change to the score.

The Fitness Function completes and reports a score of 13 for the current volume placements. An algorithm can be constructed on top of the example described above which moves one or more volumes at a time, and then runs the FF again to see if the score has improved. With just 3 tiers and 15 volumes, all possible placement combinations could be tried (an example of exhaustive physical trials) but exhaustive testing may cease to be feasible as the size of the environment grows, making a problem-solving algorithm, such as an evolutionary algorithm, desirable.

Figure 3:
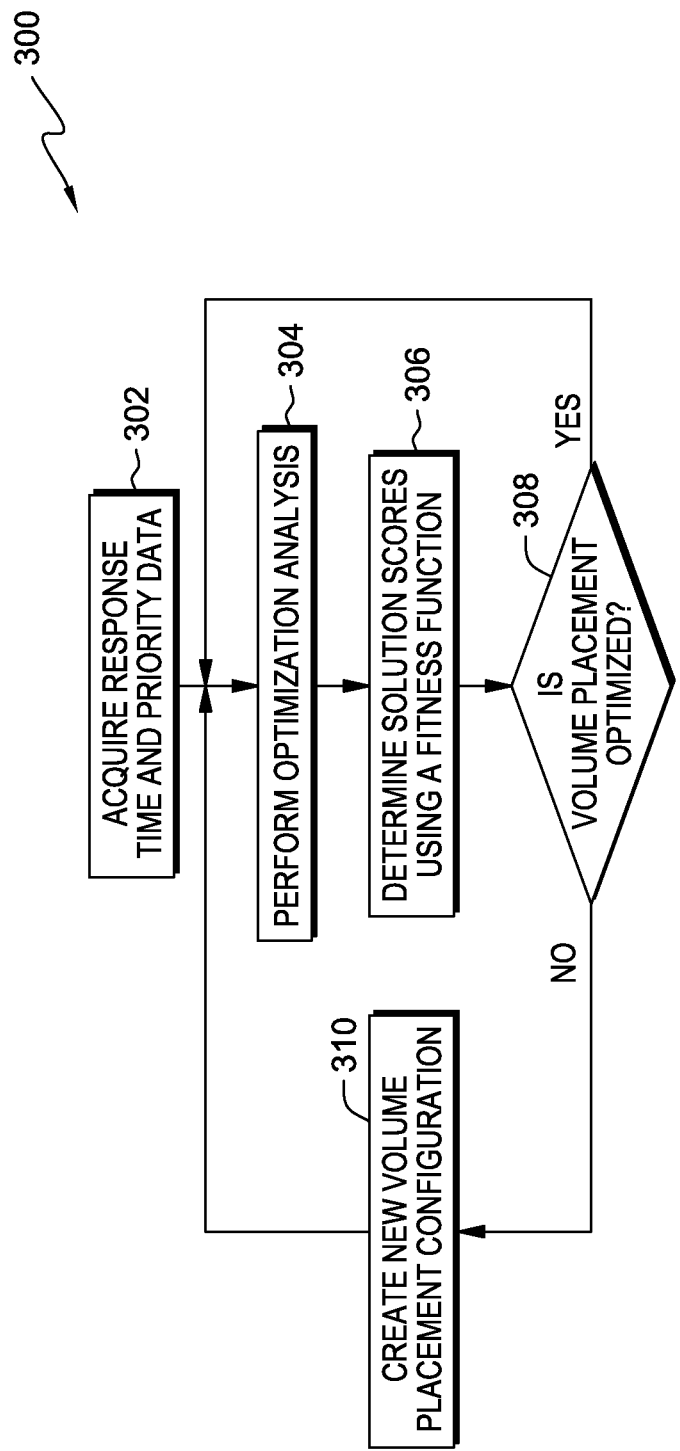
FIG. 3 is a flowchart of a volume placement optimization algorithm in an embodiment in accordance with the present invention.

FIG. 3 is a flowchart, generally depicted by the numeral 300, of a volume placement optimization algorithm in an embodiment in accordance with the present invention. In step 302, storage management software 110 (as shown in FIG. 1) acquires response time and priority data for an application, such as application 112, for which storage is being optimized. As discussed previously, information such as desired response time range, degraded (but acceptable) response time range, if provided, and an optional priority value, may be supplied by an administrator. In fact, a suggested initial volume placement may also be provided. However, as outlined above, total storage volume requirements, response times, and priority information may also be acquired from the application through messaging. Since the storage management software 110 has information about all of the available storage volumes, storage management software may make the initial volume placement decisions, knowing the response times needed.

Making the volume placement decision involves an optimization analysis (step 304). This analysis may be a check of response time for each volume allocated to a particular application. Storage management software 110 may test the response times itself, since storage management software 110 always tracks the specific volumes associated with a specific application. In the analysis step 304, a fitness function tests capacity limits for a specific set of storage pools, and if capacity limits for a storage pool are exceeded, the solution is rejected. In an embodiment, projected response times given the total volume configuration in the pool may then be calculated. This may be accomplished by feeding historic performance data, known to the storage management software 110, to a storage analysis algorithm that is capable of calculating response times for I/O loads run against specific storage configurations. An example of such an analysis algorithm, although not intended to be limiting, is Disk Magic.

In an alternative embodiment, exhaustive physical testing may be employed to characterize storage system performance. This type of performance measurement tends to work well, although it may become unworkable in systems with a large number of applications and associated storage volumes. When a particular storage solution is considered acceptable, the fitness function is used to assign a numeric score (step 306) as a way of determining whether a particular solution is better or worse than other solutions.

If the solution does not appear optimum (step 308; "no" branch), a new volume placement configuration is attempted (step 310), and the new solution is subjected to optimization analysis in step 304. If volume placement is optimum (step 308; "yes" branch), the system performs optimization analysis again (step 304) after a predetermined elapsed time, or perhaps whenever a desired response time is exceeded.

Figure 4:
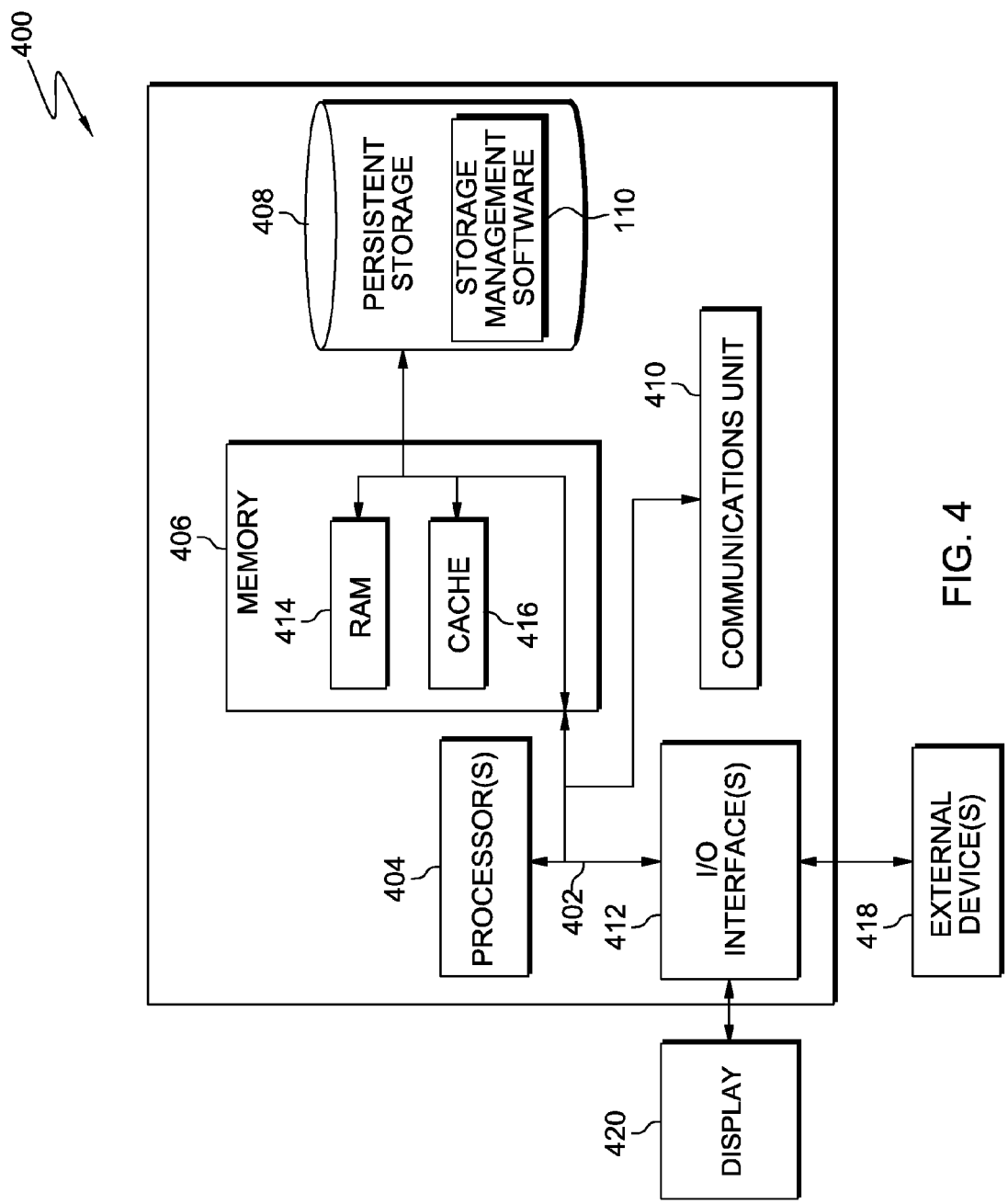
FIG. 4 is a functional block diagram of a computer system in an embodiment in accordance with the present invention.

FIG. 4 is a functional block diagram of a computer system, generally depicted by the numeral 400, in an embodiment in accordance with the present invention. Computer system 400 is representative of computer system 102, for example, hosting applications such as application 112, and storage management software 110, along with data structures and/or other resources in an illustrative embodiment in accordance with the present invention. It should be appreciated that FIG. 4 provides only an illustration of one implementation and does not imply any limitations with regard to the environments in which different embodiments may be implemented. Many modifications to the depicted environment may be made.

Computer system 400 may include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are examples of computer readable tangible storage devices. A storage device is any piece of hardware that is capable of storing information, such as data, program code in functional form, and/or other suitable information on a temporary basis and/or permanent basis. In this embodiment, memory 406 includes random access memory (RAM) 414 and cache memory 416. In general, memory 406 can include any suitable volatile or non-volatile computer readable storage device.

Storage management software 110 may be stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including systems and devices within or controlled by host computer 102. In these examples, communications unit 410 includes one or more wireless network interface cards. Communications unit 410 may provide communications through the use of either or both physical and wireless communications links. Computer programs and processes, such as storage management software 110, may be downloaded to persistent storage 408 through communications unit 410, or uploaded to another system through communications unit 410.

I/O interface(s) 412 allows for input and output of data with other devices that may be connected to host computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 may also connect to a display 420. Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining an optimal volume placement on a storage system, the method comprising:
   acquiring, by one or more processors, at least a desired response time range for each storage volume associated with an application, and at least one degraded response time range for at least one storage volume associated with the application;
   evaluating, by one or more processors, a degree of optimization of a current volume placement utilizing a numeric score assigned by a fitness function, and evaluating, by one or more processors, a degree of optimization of one or more proposed volume placement(s) utilizing numeric score(s) assigned by the fitness function for each of the proposed volume placement(s); and providing, by one or more processors, a recommendation for storage volumes that should be moved to different storage pools, based on the evaluated degree of optimization of the current volume placement and the evaluated degree of optimization of the one or more proposed volume placements, such that desired response times are met;

wherein, when an actual response time for a given storage volume of a given volume placement exceeds the respective desired response time range for the given storage volume, a portion of the given volume placement's numeric score associated with the given storage volume is multiplied by a first tunable value, and wherein, when an actual response time for a given storage volume of a given volume placement does not meet the respective desired response time range for the given storage volume, but meets the respective degraded response time range for the given storage volume, a portion of the given volume placement's numeric score associated with the given storage volume is multiplied by a second tunable value, wherein the second tunable value is larger than the first tunable value.

2. The method in accordance with claim 1, wherein acquiring, by one or more processors, at least a desired response time range for each storage volume associated with an application, and at least one degraded response time range for at least one storage volume associated with the application, further comprises:

acquiring, by one or more processors, at least a desired response time range for each storage volume associated with an application, and at least one degraded response time range for at least one storage volume associated with the application, from the application via background messaging.

3. The method in accordance with claim 1, wherein acquiring, by one or more processors, at least a desired response time range for each storage volume associated with an application, and at least one degraded response time range for at least one storage volume associated with the application, further comprises:

acquiring, by one or more processors, at least a desired response time range for each storage volume associated with an application, and at least one degraded response time range for at least one storage volume associated with the application, through measurement of input/output load values.

4. The method in accordance with claim 1, wherein acquiring, by one or more processors, at least a desired response time range for each storage volume associated with an application, and at least one degraded response time range for at least one storage volume associated with the application, further comprises:

acquiring, by one or more processors, a desired response time range for each storage volume, an acceptable degraded response time range for each storage volume, a cost value associated with each tier of storage, and a priority value for each storage volume.

5. The method in accordance with claim 1, wherein evaluating, by one or more processors, a degree of optimization of a current volume placement utilizing a numeric score assigned by a fitness function, and evaluating, by one or more processors, a degree of optimization of one or more proposed volume placement(s) utilizing numeric score(s) assigned by the fitness function for each of the proposed volume placement(s), further comprises:

performing, by one or more processors, an optimization analysis to check a response time for each volume associated with the application.

6. The method in accordance with claim 5, wherein performing, by one or more processors, an optimization analysis to check a response time for each volume associated with the application further comprises:

performing, by one or more processors, an optimization analysis by projecting volume response times, given total volume configuration in a storage pool, by feeding historic performance data to a storage analysis algorithm capable of calculating response times for input/output loads run against specific storage configurations.

7. The method in accordance with claim 5, wherein performing, by one or more processors, an optimization analysis to check a response time for each volume associated with the application further comprises:

performing, by one or more processors, exhaustive physical testing of substantially all possible storage volume configurations to characterize storage system performance.

8. A computer program product for determining an optimal volume placement on a storage system, the computer program product comprising:

one or more computer readable storage media and program instructions stored on at least one of the one or more storage media, the program instructions comprising:

program instructions to acquire at least a desired response time range for each storage volume associated with an application, and at least one degraded response time range for at least one storage volume associated with the application;

program instructions to evaluate a degree of optimization of a current volume placement utilizing a numeric score assigned by a fitness function, and evaluate a degree of optimization of one or more proposed volume placement(s) utilizing numeric score(s) assigned by the fitness function for each of the proposed volume placement(s); and program instructions to provide a recommendation for storage volumes that should be moved to different storage pools, based on the evaluated degree of optimization of the current volume placement and the evaluated degree of optimization of the one or more proposed volume placements, such that desired response times are met;

wherein, when an actual response time for a given storage volume of a given volume placement exceeds the respective desired response time range for the given storage volume, a portion of the given volume placement's numeric score associated with the given storage volume is multiplied by a first tunable value, and wherein, when an actual response time for a given storage volume of a given volume placement does not meet the respective desired response time range for the given storage volume, but meets the respective degraded response time range for the given storage volume, a portion of the given volume placement's numeric score associated with the given storage volume is multiplied by a second tunable value, wherein the second tunable value is larger than the first tunable value.

9. The computer program product of claim 8, wherein program instructions to acquire at least a desired response time range for each storage volume associated with an application, and at least one degraded response time range for at least one storage volume associated with the application, further comprise:
   program instructions to acquire at least a desired response time range for each storage volume associated with an application, and at least one degraded response time range for at least one storage volume associated with the application, from the application via background messaging.

10. The computer program product of claim 8, wherein program instructions to acquire at least a desired response time range for each storage volume associated with an application, and at least one degraded response time range for at least one storage volume associated with the application, further comprise:
   program instructions to acquire at least a desired response time range for each storage volume associated with an application, and at least one degraded response time range for at least one storage volume associated with the application, through measurement of input/output load values.

11. The computer program product of claim 8, wherein program instructions to acquire at least a desired response time range for each storage volume associated with an application, and at least one degraded response time range for at least one storage volume associated with the application, further comprise:
   program instructions to acquire a desired response time range for each storage volume, an acceptable degraded response time range for each storage volume, a cost value associated with each tier of storage, and a priority value for each storage volume.

12. The computer program product of claim 8, wherein program instructions to evaluate a degree of optimization of volume placement utilizing a numeric score assigned by a fitness function, and evaluate a degree of optimization of one or more proposed volume placement(s) utilizing numeric score(s) assigned by the fitness function for each of the proposed volume placement(s), further comprise:
   program instructions to perform an optimization analysis to check a response time for each volume associated with the application.

13. The computer program product of claim 12, wherein program instructions to perform an optimization analysis to check a response time for each volume associated with the application further comprise:
   program instructions to perform an optimization analysis by projecting volume response times, given total volume configuration in a storage pool, by feeding historic performance data to a storage analysis algorithm capable of calculating response times for input/output loads run against specific storage configurations.

14. The computer program product of claim 12, wherein program instructions to perform an optimization analysis to check a response time for each volume associated with the application further comprise:
   program instructions to perform exhaustive physical testing of substantially all possible storage volume configurations to characterize storage system performance.

15. A computer system for determining an optimal volume placement on a storage system, the computer system comprising:
   one or more computer processors;
   one or more computer readable storage media; and
   program instructions to acquire at least a desired response time range for each storage volume associated with an application, and at least one degraded response time range for at least one storage volume associated with the application;
   program instructions to evaluate a degree of optimization of a current volume placement utilizing a numeric score assigned by a fitness function, and evaluate a degree of optimization of one or more proposed volume placement(s) utilizing numeric score(s) assigned by the fitness function for each of the proposed volume placement(s); and
   program instructions to provide a recommendation for storage volumes that should be moved to different storage pools, based on the evaluated degree of optimization of the current volume placement and the evaluated degree of optimization of the one or more proposed volume placements, such that desired response times are met;
   wherein, when an actual response time for a given storage volume of a given volume placement exceeds the respective desired response time range for the given storage volume, a portion of the given volume placement's numeric score associated with the given storage volume is multiplied by a first tunable value, and
   wherein, when an actual response time for a given storage volume of a given volume placement does not meet the respective desired response time range for the given storage volume, but meets the respective degraded response time range for the given storage volume, a portion of the given volume placement's numeric score associated with the given storage volume is multiplied by a second tunable value, wherein the second tunable value is larger than the first tunable value.

16. The computer system of claim 15, wherein program instructions to acquire at least a desired response time range for each storage volume associated with an application, and at least one degraded response time range for at least one storage volume associated with the application, further comprise:
   program instructions to acquire at least a desired response time range for each storage volume associated with an application, and at least one degraded response time range for at least one storage volume associated with the application, from the application via background messaging.

17. The computer system of claim 15, wherein program instructions to acquire at least a desired response time range for each storage volume associated with an application, and at least one degraded response time range for at least one storage volume associated with the application, further comprise:
   program instructions to acquire at least a desired response time range for each storage volume associated with an application, and at least one degraded response time range for at least one storage volume associated with the application, through measurement of input/output load values.

18. The computer system of claim 15, wherein program instructions to acquire at least a desired response time range for each storage volume associated with an application, and at least one degraded response time range for at least one storage volume associated with the application, further comprise:
   program instructions to acquire a desired response time range for each storage volume, an acceptable degraded response time range for each storage volume, a cost value associated with each tier of storage, and a priority value for each storage volume.

19. The computer system of claim 15, wherein program instructions to evaluate a degree of optimization of volume placement utilizing a numeric score assigned by a fitness function, and evaluate a degree of optimization of one or more proposed volume placement(s) utilizing numeric score(s) assigned by the fitness function for each of the proposed volume placement(s), further comprise:

program instructions to perform an optimization analysis to check a response time for each volume associated with the application.

20. The computer system of claim 19, wherein program instructions to perform an optimization analysis to check a response time for each volume associated with the application further comprise:

program instructions to perform an optimization analysis by projecting volume response times, given total volume configuration in a storage pool, by feeding historic performance data to a storage analysis algorithm capable of calculating response times for input/output loads run against specific storage configurations.

* * * * *